No. 670,762. Patented Mar. 26, 1901.
V. BOWMAN.
CHART.
(Application filed July 28, 1900.)
(No Model.) 2 Sheets—Sheet 2.

WITNESSES:
L.C. Hills
Alfred T. Page

INVENTOR:
Viola Bowman,
BY E.B. Stocking
Attorney

UNITED STATES PATENT OFFICE.

VIOLA BOWMAN, OF DUBOIS, PENNSYLVANIA.

CHART.

SPECIFICATION forming part of Letters Patent No. 670,762, dated March 26, 1901.

Application filed July 28, 1900. Serial No. 25,181. (No model.)

*To all whom it may concern:*

Be it known that I, VIOLA BOWMAN, a citizen of the United States, residing at Dubois, in the county of Clearfield, State of Pennsylvania, have invented certain new and useful Improvements in Pattern-Charts, of which the following is a specification, reference being had therein to the accompanying drawings.

This invention relates to pattern-charts, and particularly to a chart comprising a form provided with measuring characters by which either patterns or garments may be drafted from a proper series of measurements.

The invention has for one object to provide several parts of the chart with suitable indicating-lines and measurements thereon and with measures independent of the chart and supported thereon to move in a fixed path.

A further object of the invention is to so arrange these movable measures that they may coöperate with each other at their point of intersection to provide a desired indication for drafting the pattern.

Other objects and advantages of the invention will hereinafter appear in the following description and the novel features thereof will be particularly pointed out in the appended claims.

Figure 1:
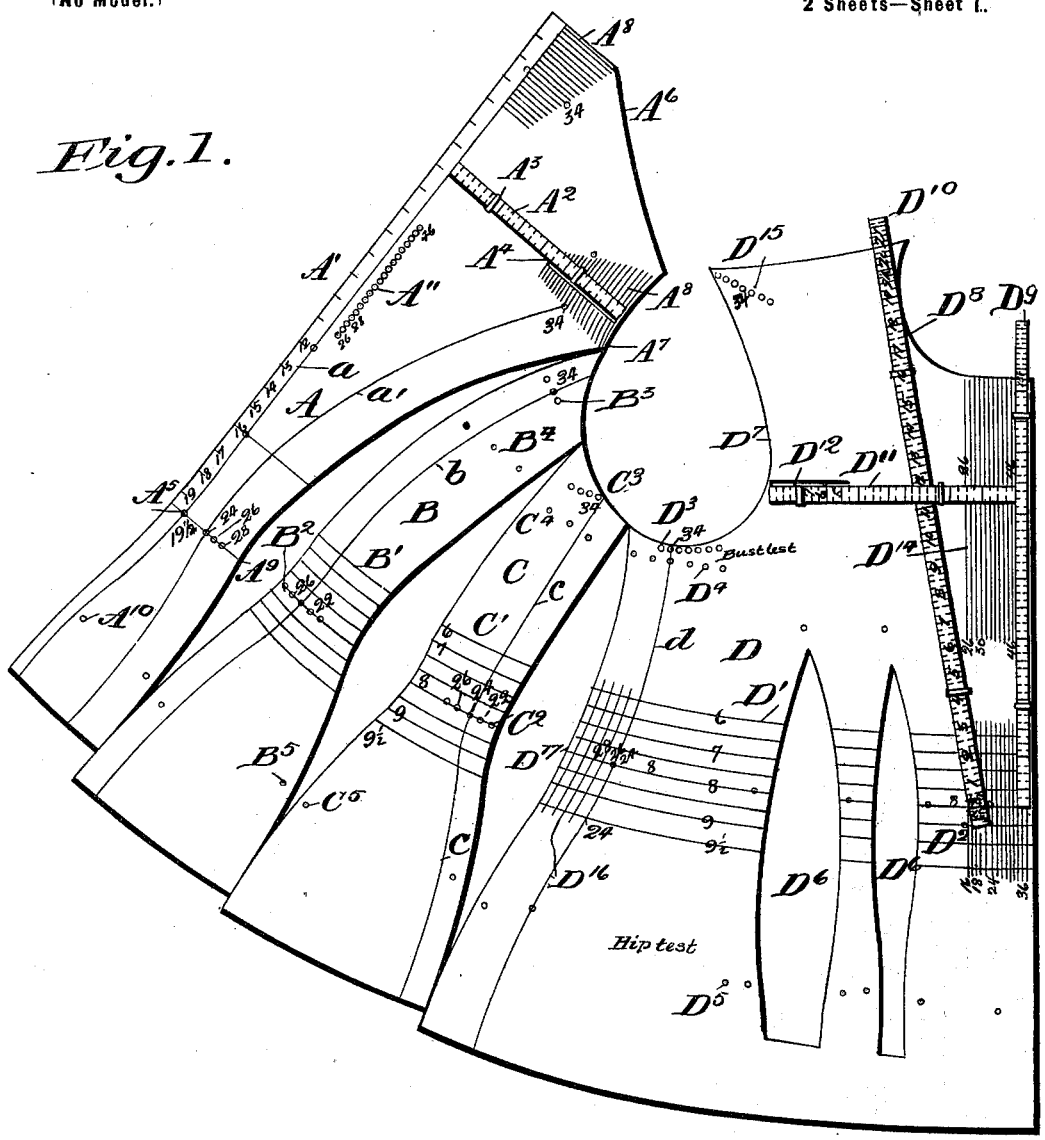
Figure 2:
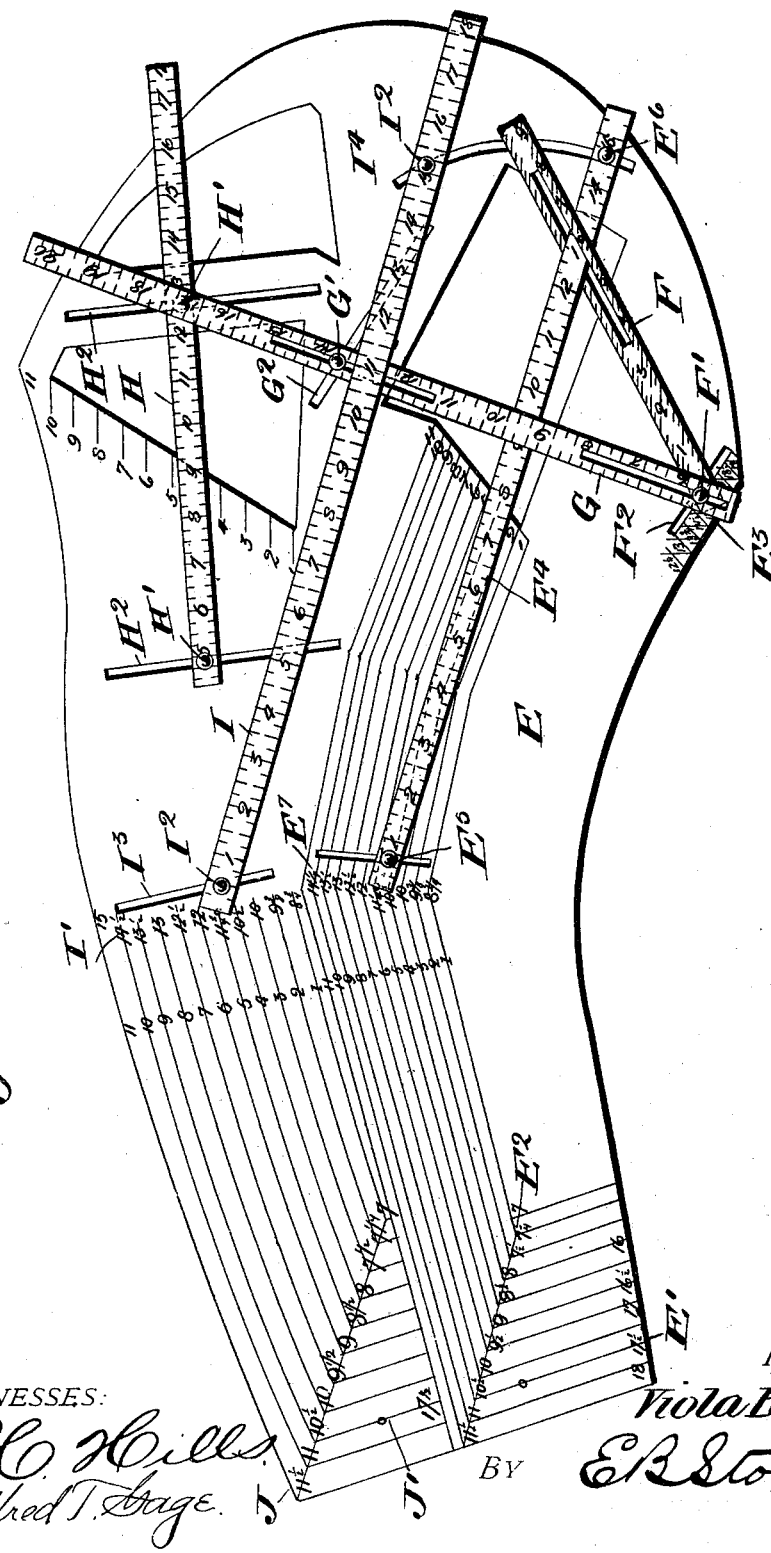

In the drawings, Figure 1 represents a plan of the members of the chart for drafting the body of a waist, and Fig. 2 is a chart for drafting a sleeve.

Like characters of reference indicate like parts throughout both figures of the drawings.

The letter A indicates a chart for the half-back; B, the side back; C, the side under arm, and D the front, it being understood that the chart members are for drafting a pattern covering one half the body of the garment, the opposite half being of identical design and the two parts drafted from the same chart.

The letter E indicates a sleeve-chart, which for the purpose of illustration is shown in Fig. 2 upon an enlarged scale and will be hereinafter more fully described.

By the use of the word "pattern" in the following description I intend thereby to cover the drafting either of a paper or fabric pattern or the actual drafting of the design upon the goods or material from which the garment is to be made.

For the purpose of defining and illustrating the several features of the invention in the following description reference will be made to a series of measurements as an illustration of a possible pattern to be drafted from the chart, so that in the structural description the relation of the measurements upon the chart to the others taken will be clearly apparent. For this purpose the following measurements are to be taken from the person for whom the pattern is to be drafted: bust-measure, thirty-four inches; waist, twenty-four inches; hip, thirty-nine inches; from under arm to waist, eight inches; length of back from neck to waist, sixteen inches; back and front over shoulder, nineteen and one-fourth inches; neck-front to waist, thirteen and one-half inches; width of front shoulder, twelve and one-half inches; width of back shoulder, eleven and one-half inches, and arm-scye, sixteen and one-fourth inches.

Referring now to the back-chart A, it will be seen that the same is provided with a back measure or scale A', from which the length of the back (sixteen inches) will be obtained and properly marked through the usual apertures which accompany each of the indicating-lines, hereinafter mentioned, upon charts of this character. Extending transversely of the chart, at the back opposite the shoulder, I have provided a movable measure $A^2$, adapted to be held in position by means of loops $A^3$ and adapted to travel in a fixed path parallel with a slot $A^4$, extending through the chart A. This scale $A^2$ is used to measure the width from the center of the back to the shoulder, which upon one half of the back would be five and three-fourths inches, making a total width of eleven and one-half inches. The pattern to be drafted would be marked at that point through the slot $A^4$ extending adjacent to the scale. The complete length of the back and front from the top of the shoulder—to wit, nineteen and one-half inches—may be indicated by the lower portion $A^5$ of the chart. The upper part of the chart is provided with a curved face $A^6$ for drafting the shoulder-curve and a similar face $A^7$ for drafting the arm-curve. At opposite sides of the shoulder-curve a series of bust-indicating measurements $A^8$ are located, and in the present instance measure thirty-four inches is taken. A proper indication is then made upon the pattern through the aperture for twenty-four inches upon the waist-line $A^9$, while at the lower portion of the chart are suitable indicating-perforations $A^{10}$ for locating the point of measurement for the hip-test. From the foregoing it will be seen that the points are obtained for drafting such a back line for the waist as is shown at $a$ upon the chart and a similar curved outline $a'$ for coöperating with the side back. The several points of this measurement will be joined by the proper edges of the chart, as is the usual practice in this class of devices, it being apparent that the essential points of measurement are indicated through the chart and upon the pattern, so that it is only necessary to connect the same by the lines to be drafted. This chart is also provided with a series of bust-tests $A^{11}$, calculated downward from the top of neck and adapted to coöperate with the other members of the chart.

Next referring to the side back it will be seen that the same is provided with a series of transverse measures $B'$ to indicate the under-arm length to the waist-line, and upon these transverse measures a suitable series of perforations is disposed to indicate the point of intersection with each of the waist-measures $B^2$. The top of the chart B is also provided with a series of measuring-perforations $B^3$ for indicating the bust measurement, and below these is a series of bust-test points $B^4$, calculated upward from the waist-line and adapted to coöperate with the back-tests, while the lower portion of the chart is provided with hip-test points $B^5$. By this method the proper indicating-points are obtained for drafting an outline, such as $b$, upon a pattern extending from the bust-point 34 at the top through the under-arm line 8 at its intersection with the waist-measure 24, as shown in Fig. 1.

The side or under-arm portion of the chart is provided with the transverse under-arm measures $C'$ and the waist-line indications $C^2$, together with the bust-indications $C^3$, all as more particularly described in connection with the section B. A series of bust-test perforations $C^4$ and hip-tests $C^5$ are provided, as hereinbefore described. In drafting a pattern from this section the proper curved edge of the chart C is placed at the point marked through the perforation 34 of the bust-measure and carried thence to the perforations for the waist-measure 24 upon the under-arm line 8, thence to the bottom of the chart or the desired length. In this connection it may be stated that the several hip-test measures are located at a predetermined distance from the lower line of the under-arm measures, so that by moving the chart upward to bring the lower line of the under-arm measure upon the waist-line—for instance, 24—a uniform hip-line is established in the pattern. The line which would be placed upon the pattern following the several indications just described is illustrated at $c$ upon the chart C.

The front section D of the chart is provided with a series of under-arm lines or indications $D'$, intersected at one end by a series of indications $D^2$ for the waist-line, and is provided with the bust-indications $D^3$ at the arm-scye, while the bust-test perforations $D^4$ and hip-tests $D^5$ are located as hereinbefore described. This portion of the chart is also provided with the usual bust-darts $D^6$, and at its upper portion is formed with curved outline $D^7$ to conform to the front arm and shoulder, and an oppositely-curved face $D^8$ for the purpose of drafting the outline for the neck. The front straight edge of this section is provided with a movable measure $D^9$, held in a fixed path by any suitable means and adapted to ascertain the measure from the under-arm line—for instance, 8—upward to the neck. In the illustrations of measurements given this will be thirteen and one-half inches upon the measure $D^9$. A back and front shoulder tape $D^{10}$ is also suitably mounted upon the chart to move in a fixed path, while a similarly-mounted front-shoulder measure $D^{11}$ is provided, and parallel therewith a slot $D^{12}$ is disposed, through which the proper marks may be made upon the pattern. By means of the sliding measure $D^{10}$ the back and front shoulder length (nineteen and one-fourth inches) may be properly measured from the waist-line upward, while one-half of the total width of the front shoulder (six inches) will be measured from the edge of the chart toward the arm-scye by means of the measure $D^{11}$. The curved face $D^8$ registers with the top $D^{10}$, and the usual scale may be omitted, while at the end of the line of bust-test measures a suitable series of indications $D^{14}$ is provided. At the extreme upper portion of the chart a diagonally-disposed series of bust-measurement indications $D^{15}$ is provided. In drafting a pattern from this front section of the chart the sliding scale of measure $D^9$ is placed in position to correspond with the under-arm line 8 in the illustration given. From this point the thirteen and one-half inches for the neck-front are measured upward and the usual inset-marks made for the hem. The back and front shoulder measure $D^{10}$ is then adjusted so that the proper bust-indication 34 will be opposite the under-arm measure 8, and then a proper indication is placed at "$19\frac{1}{4}''$" upon this scale or measure, which indicates the upper extremity of the pattern. The front-shoulder measure $D^{11}$ is then adjusted to measure inward from the hem near scale $D^9$ one-half or six inches of the front-shoulder measure, which is indicated through the slot $D^{12}$ at one side of the arm-scye. The proper indications are then made through the apertures at the bust-scale $D^{15}$ and $D^3$, while below the latter scale an indication is placed at the intersection of the under-arm indications $D'$ with the several waist-line indications $D^{16}$. The several points thus indicated are connected with lines upon the pattern by the use of the edge of the chart, while the darts or other details are inserted in the usual manner well known to the dressmakers—for instance, the points of indications on scales $D^3$ and $D^{16}$ may be connected by a line, as shown at $d$, drafted with the use of the outer curved edge $D^{17}$ of the chart.

For the purpose of illustrating the application and use of the sleeve-chart E (shown in Fig. 2) reference will be made to certain sleeve measurements in the description of the invention which will be based upon a sleeve having an inseam of seventeen and one-half inches and measurement of eleven and one-fourth inches width around the elbow and twelve and one-half inches from the elbow to the back shoulder. The width of cuff or hand will be eight and one-half inches and the arm-scye seventeen inches, while the length from the top of shoulder to elbow will be fifteen and one-half inches. In drafting a pattern from this chart the first point will be taken at the indication "$17\frac{1}{2}''$" of scale $E'$ of the inseam at its line of intersection with the scale $E^2$ for the cuff or hand width. From the indication $E'$ a proper line will be drawn to the indication "$17\frac{1}{2}''$" upon scale $E^3$ at the upper end of the inseam. The elbow-measure $E^4$ is suitably mounted to move in a fixed path laterally by means of a suitable fastening $E^5$, traveling in a straight slot, and at its free end the fastening $E^6$ is adapted to travel in a curved slot to permit an oscillatory as well as lateral movement of the scale. This scale at one end intersects and, if preferred, passes through the arm-scye measure F, which is secured at one end by fastening $F'$ and adapted to be moved along the slot $F^2$. In the illustration hereinbefore referred to one end of the elbow-measure $E^4$ is placed opposite the indication "$11\frac{1}{4}''$" upon the elbow-scale $E^7$ and twelve and one-half inches measured upon the measure $E^4$. The arm-scye measure F is moved upward until it coincides with this point "$12\frac{1}{2}''$," which in the present case gives a measurement of six inches from the point "$17\frac{1}{2}$" on the scale $E^3$ to the intersection between the elbow-measure and the arm-scye measure. At this point a proper indication is made through the aperture in the chart, as also at the point "$11\frac{1}{4}$" upon the scale $E^7$, and the several points properly connected by lines formed by using the faces or edges of the chart. In forming the upper sleeve-section a similar operation is pursued, and the point of intersection between the elbow-measure and the arm-scye measure—for instance, 6—is brought to the edge of the chart by moving the upper arm-scye scale G, which is suitably slotted and adapted to reciprocate upon the fastening $F'$ and an additional fastening $G'$.

The scale may be moved laterally at its lower end within the slot $F^2$ and at its other end within the slot $G^2$, thus permitting both a lateral and longitudinal movement of the measure. The outer or free end of the measure G is then moved along the elbow-measure H until it communicates with the indication "$12\frac{1}{2}$," which in the illustration given is at the point "17" upon the scale G and constitutes the upper arm-scye measurement. A suitable marking is placed at this point upon the pattern beneath the chart. The elbow-measure H is secured at opposite portions by means of fastenings $H'$, adapted to move with the scale laterally by means of slots $H^2$, formed in the body of the chart. One end of the top shoulder-scale I will then be placed at the indication "$11\frac{1}{4}$" of the elbow-scale $I'$ and a proper marking made through the chart at the point "$15\frac{1}{2}$" upon the top shoulder-measure. This measure is secured at both ends by means of fastenings $I^2$, one of which travels in a straight slot $I^3$ and the other in a curved slot $I^4$. A marking is also made through the chart upon the pattern at the point "$11\frac{1}{4}$" of the scale $I'$ and a similar marking at the line of intersection between the upper cuff-scale J at "$8\frac{1}{2}$" and the line "$17\frac{1}{2}$" upon the elbow-scale $J'$. The several points of marking are then connected together in the usual manner to produce a complete pattern.

From the foregoing description it will be obvious that the system of measures provided is such as to materially reduce the number of independent measurements to be taken for the formation of the garment and the consequent calculation in cutting the several parts, as the resultant of two measures intersecting each other will give the desired point of measurement. The measures are also suitably mounted to permit their movement and adjustment in fixed paths upon the surface of the chart, so as to prevent displacement of the same and the consequent difficulty of securing the proper results in using the device. While the method of measuring and using the chart has been hereinbefore described, still it will be obvious that the invention is not confined to such use of the several measures, as it is obvious that changes in the details of construction and functions to which the same are placed may be made without departing from the spirit of the invention as defined by the appended claims. It will also be apparent that other scales, measures, and indicating characters may be applied to the chart, if desired and as found necessary, as in the present illustration only such have been illustrated as would be sufficient for a description of the use of the several measures.

Having described my invention, what I claim as new, and desire to secure by Letters Patent, is—

1. A pattern-chart provided with indicating characters, a scale-measure secured at opposite sides of its center to said chart and adapted to move thereon in a predetermined path, and a movable measure adapted to coincide with indicating characters upon the chart and to move in a predetermined path across said scale-measure at an angle to its length; substantially as specified.

2. In a pattern-chart, a body portion provided with indicating characters and guiding-slots, a scale-measure secured at each end to said body by fastening devices passing through said slots and movable in a predetermined path, and a movable measure adapted to coincide with indicating characters upon the base and intersecting said first-mentioned measure whereby the angle formed by lines from different points and of different lengths may be determined; substantially as specified.

3. In a pattern-chart, a base provided with guiding-slots and marking-apertures therein, a longitudinally-slotted scale-measure, and fastenings passing through the slot of the measure for securing said measure in the slots of said base, whereby the measure is adapted for longitudinal and lateral movement relative to the base; substantially as specified.

4. A pattern-chart comprising a sleeve section or base having marking-apertures and provided with independent arm-scye measures F and G pivoted thereon at a common point and adapted to intersect a laterally-extending elbow-measure secured to said base; substantially as specified.

5. A pattern-chart comprising a sleeve section or base having marking-apertures and provided with independent arm-scye measures F and G pivoted thereon at a common point and adapted to intersect a laterally-extending elbow-measure secured to said base, and a shoulder-measure extending between said elbow-measures; substantially as specified.

6. A pattern-chart comprising a base having marking-apertures and provided with elbow-scales $E^7$ and $I'$, an elbow-measure $E^4$ mounted for lateral movement opposite said scale $E^7$, an elbow-measure H adapted for lateral movement in an alinement with the scale $I'$, a pivoted under-arm-scye measure F mounted for lateral movement and adapted to intersect the measure $E^4$, and a pivoted slotted upper-arm-scye measure G adapted for lateral and longitudinal movement and to intersect the elbow-measure H; substantially as specified.

7. A pattern-chart comprising a base having marking-apertures and provided with elbow-scales $E^7$ and $I'$, an elbow-measure $E^4$ mounted for lateral movement opposite said scale $E^7$, an elbow-measure H adapted for lateral movement in alinement with the scale $I'$, a pivoted under-arm-scye measure F mounted for lateral movement and adapted to intersect the measure $E^4$, a pivoted slotted upper-arm-scye measure G adapted for lateral and longitudinal movement and to intersect the elbow-measure H, and a shoulder-measure I extending from the scale $I'$ toward the opposite end of the chart; substantially as specified.

8. A pattern-chart comprising a base having marking-apertures and provided with elbow-scales $E^7$ and $I'$, an elbow-measure $E^4$ mounted for lateral movement opposite said scale $E^7$, an elbow-measure H adapted for lateral movement in alinement with the scale $I'$, a pivoted under-arm-scye measure F mounted for lateral movement and adapted to intersect the measure $E^4$, a pivoted slotted upper-arm-scye measure G adapted for lateral and longitudinal movement and to intersect the elbow-measure H, a shoulder-measure I extending from the scale $I'$ toward the opposite end of the chart, inseam-scales $E'$ and $E^3$ at the opposite ends of the chart, the latter coöperating with the independent arm-scye measures, and cuff-scales $E^2$ and J at the hand end of the sleeve; substantially as specified.

In testimony whereof I affix my signature in presence of two witnesses.

VIOLA BOWMAN.

Witnesses:
ALMA NELSON,
W. T. SMITH.